March 4, 1958  A. LEINONEN  2,825,174
FISHHOOK WITH LIVE BAIT HOLDER
Filed Feb. 1, 1956
Fig. 1
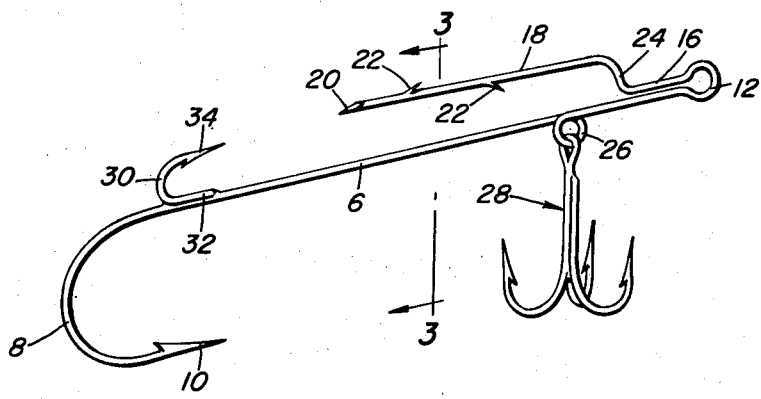
Fig. 3
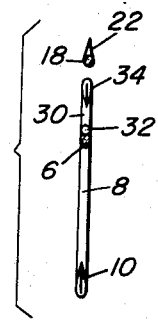
Fig. 2
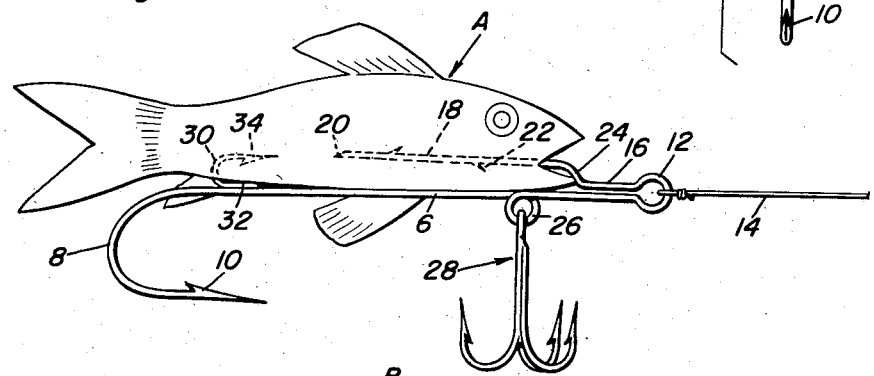
Fig. 5
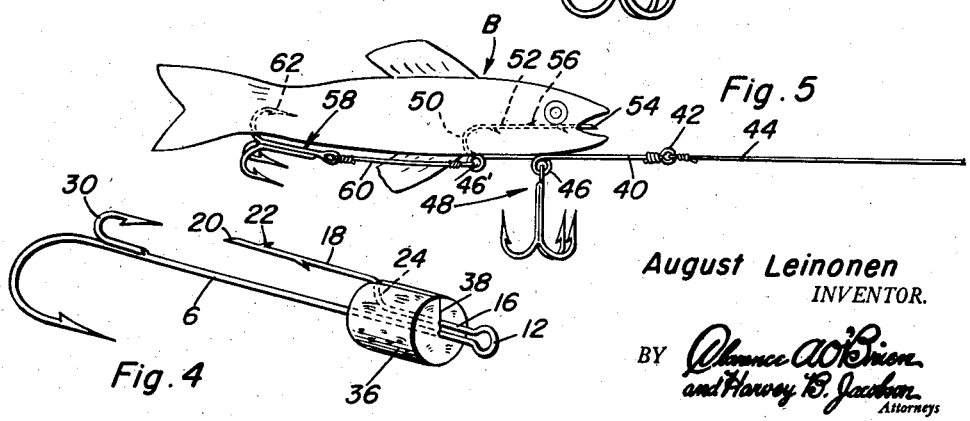
Fig. 4
August Leinonen
INVENTOR.
BY *Clarence A. O'Brien*
and *Harvey B. Jacobson*
Attorneys

United States Patent Office 2,825,174
Patented Mar. 4, 1958

2,825,174

FISHHOOK WITH LIVE BAIT HOLDER

August Leinonen, Ontonagon, Mich.

Application February 1, 1956, Serial No. 562,830

2 Claims. (Cl. 43—44.8)

The present invention relates to a fishing device characterized by a shank to which a line is attached, said shank having fishhook means thereon and being provided with an impaling prong which is so mounted and attached to the shank that it serves to support a live bait, a minnow for example, in a reliable position for making a catch.

One form of the invention is possessed of the aforementioned structural characteristics wherein the impaling prong is an integral extension of one end of the shank and is joined to the shank by way of a fish line attaching eye and an offset bend which latter serves to dispose the prong in a position in which it is disposed in spaced parallelism alongside of the shank.

It is also an object of the invention to provide a simple cork or equivalent float and to attach the same to one end of the device so that it will float atop or near the top of a body of water and will permit the fisherman to use flies, grasshoppers and similar insects for bait.

It is also an object of the invention to provide a form of construction in which a shank is provided at one end with an eye for attaching the line at the other end with a return bend which is fashioned into an impaling prong, there being a leader or the like attached to the intermediate portion of the shank and extending rearwardly of the same and carrying a multiple-prong fishhook.

Other objects, features and advantages of the invention will become more readily apparent from the following description and the accompanying sheet of drawings.

In the drawings:

Figure 1 is a perspective view of one embodiment of the invention;

Figure 2 is a side elevation of the same showing how the live bait appears when in use thereon;

Figure 3 is a section on the vertical line 3—3 of Figure 1;

Figure 4 is a perspective view showing a construction somewhat similar to that of Figs. 1 to 3, inclusive, with a float added and with the hook eye 26 omitted; and Figure 5 is a side elevation showing a modified form of the invention.

Referring now to Figures 1 to 4 inclusive, the shank, which is substantially rigid and linearly straight is denoted by the numeral 6 and has a return bend 8 terminating in a barb 10 and providing a conventional-type fishhook. The opposite end of the shank is bent upon itself as at 12 to provide an eye for attaching the fishing line 14. The rod or other stock from which the shank is formed is provided with an extension including a short portion 16 which is in close proximity to the adjacent part of the shank, the free end of this extension being fashioned into a substantially straight live bait impaling prong 18 having a pointed free end 20 and spurs or barbs 22. The numeral 24 designates a bend which serves to offset the prong and to maintain it in the desired position of spaced parallelism. The shank 6 is also formed with another eye 26 to accommodate the triple-prong fishhook 28, a conventional type of a hook. The impaling prong by itself does not serve to satisfactorily hold the bait, the live minnow A, for example, in satisfactory position atop the shank 6. So an anchor hook is provided and this comprises a curvate bend 30 having an end portion 32 superimposed on and affixed to the shank adjacent the bend 8, there being a barb at 34 which forms the anchor hook proper. So this anchor hook and the impaling prong together serve in the manner shown to satisfactorily mount the live bait on the fishhook.

In some instances it is desired to complement or supplement the construction stated with float means. This is accomplished in the instant situation through the medium of an appropriate float. For example, the simple cork 36 is provided as seen in Figure 4 and this has a slit or groove 38 formed therein so that it may be thus bifurcated and so that the furcations resulting therefrom straddle the shank 6 and portion 16 of the extension. Thus equipped with a float, the device serves as satisfactorily to hold a grasshopper, insect or the like, and to keep the same atop the water and preserved against drowning.

In the modification seeen in Figure 5, the device comprises a shank 40 with an eye 42 at one end to accommodate the fishing line 44, with an eye intermediate its ends as at 46 to accommodate the triple-prong fishhook 48. There is a return bend 50 formed into an auxiliary shank 52 which has a pointed free end 54 and spines or spurs 56, said auxiliary shank serving as the aforementioned impaling prong or an end portion of the live bait bead. In this instance the tail portion of the bait is fastened to one of the prongs of a second triple-prong fishhook 58 which is connected by a flexible leader or the like to an eye 46'. Thus, the prong 62 here functions similarly to the barbed hook 30 and 34 but the connection is flexible at 60 instead of rigid as at 6. In any event or in both instances the tail hook means constitutes or takes the form of an "anchoring" hook.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing device comprising a rigid shank having a return bend and a barbed bill at one end providing a conventional-type fishhook, said shank being provided adjacent said one end and inwardly of the return bend with a barbed bait anchoring hook, the other end of said shank having a fishing line eye formed therein and further having an integral extension, said extension paralleling said shank adjacent to said line eye and being provided with a bend lateral to said shank and a linearly straight portion also paralleling said shank and having spines and providing an impaling prong, said prong having a pointed free end and terminating in longitudinally spaced relation from said barbed bill.

2. A fishing device comprising a single rod member bent upon itself intermediate its ends and providing a rigid linearly straight shank, the intermediate portion of said rod being formed into a line attaching eye, an extension including a straight short portion in close proximity to an adjacent part of the shank and paralleling the shank, the intermediate portion of said extension being directed laterally and away from said shank and the remainder of the extension being straight and paralleling an intermediate portion of said shank in spaced relationship thereto and being provided with spurs when defining an impaling prong having a pointed free end terminating at about the median portion of said shank, the end of the shank opposite to said line eye being formed with a return bend and providing a conventional type fishhook, a bait hook having a barbed point in approximate axial alignment with said prong and spaced from the pointed end of the prong and also having an end portion attached to said shank inwardly of the return bend, and that portion of the shank inwardly of said line eye having a second eye formed therein for the attachment thereto of a multiple prong fishhook.

References Cited in the file of this patent

UNITED STATES PATENTS

| | | |
|---|---|---|
| 979,891 | Schield | Dec. 27, 1910 |
| 1,961,539 | White | June 5, 1934 |
| 2,476,126 | Weiss | July 12, 1949 |
| 2,591,764 | Allen | Apr. 8, 1952 |

FOREIGN PATENTS

| | | |
|---|---|---|
| 513,045 | Canada | May 24, 1955 |